May 26, 1964  E. L. ARGANESE  3,134,621
VEHICLE CONSTRUCTION
Filed Oct. 11, 1960  2 Sheets-Sheet 1
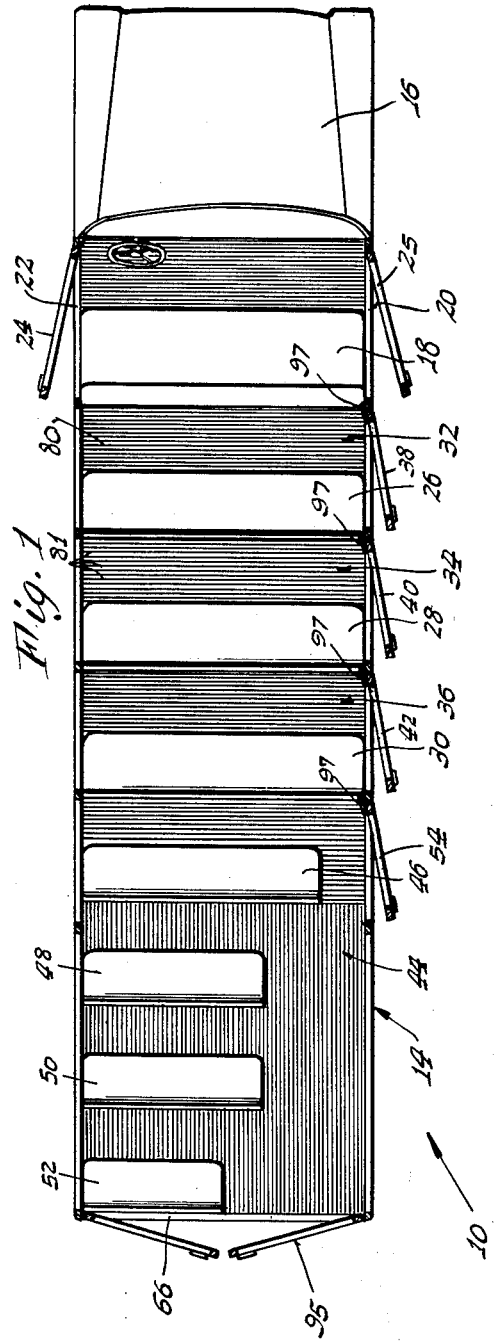
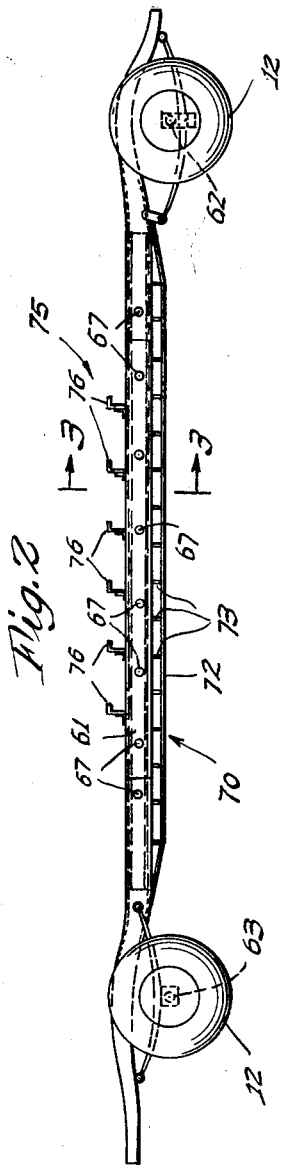
INVENTOR.
Eugene L. Arganese
BY
March and Curtiss
ATTORNEYS May 26, 1964  E. L. ARGANESE  3,134,621
VEHICLE CONSTRUCTION
Filed Oct. 11, 1960  2 Sheets-Sheet 2
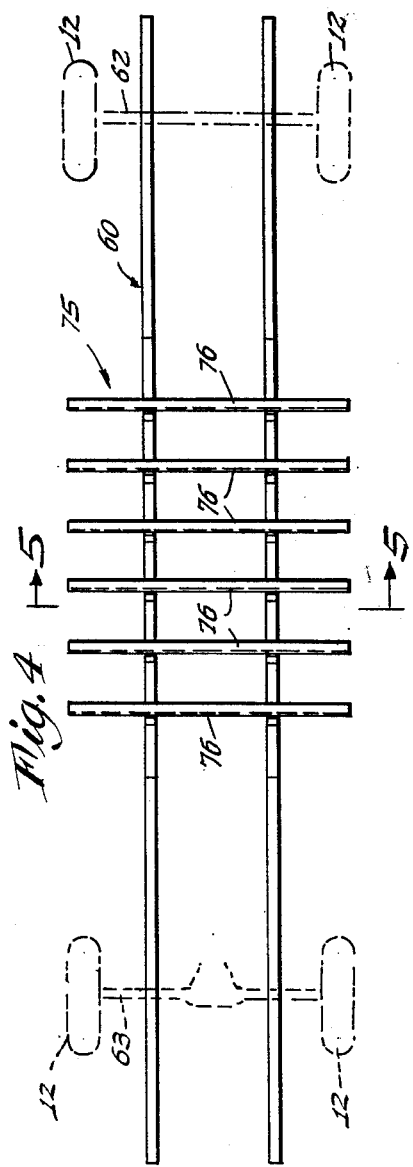
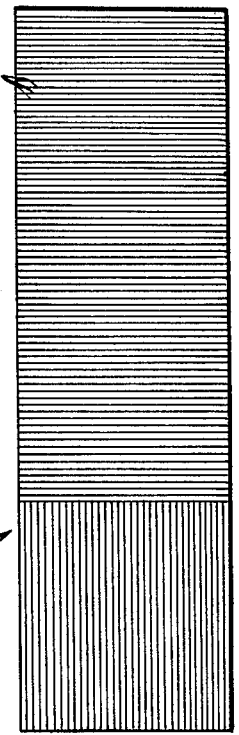
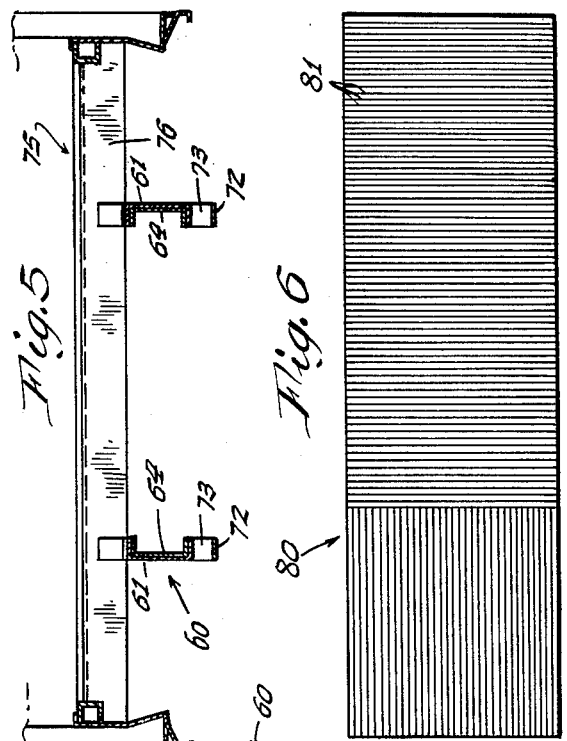
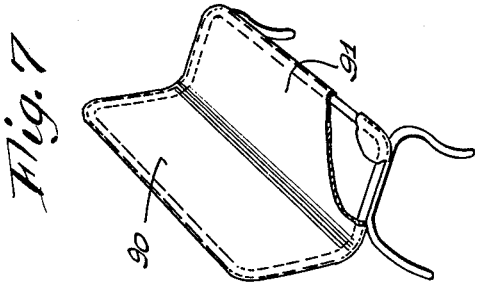
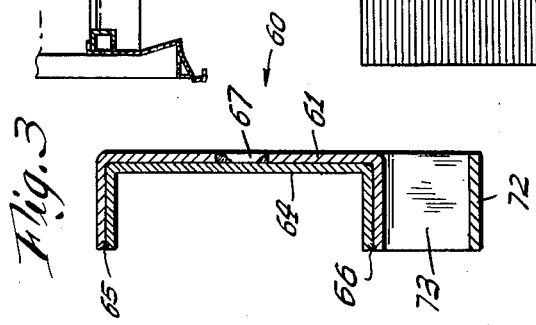
INVENTOR.
Eugene L. Arganese
BY
March and Curtiss
ATTORNEYS

United States Patent Office 3,134,621
Patented May 26, 1964

3,134,621
VEHICLE CONSTRUCTION
Eugene L. Arganese, 4131 Main St., Bridgeport, Conn.
Filed Oct. 11, 1960, Ser. No. 61,974
1 Claim. (Cl. 296—64)

This invention relates in general to vehicle constructions and more particularly to a new and useful construction of a public carrier or bus.

Presently buses are for the most part constructed with a single front access door and one additional exit toward the rear and the seating arrangements are such that the body of the bus must be of substantial length and width in order to accommodate sufficient seats for a large number of persons. When children, who require much less space than adults are to be transported it has been customary to employ ordinary buses with the large seat spacing required for adults or to use a station wagon or the like with little seating capacity. While buses have also been proposed provided with doors adjacent the seats, the construction thereof was such that an extended wheel base and enlarged body were nevertheless required in order to safely accommodate and carry the desired number of people.

The present invention has particular application as a vehicle for transporting children and in particular retarded children. The vehicle advantageously includes a body construction of relatively narrow width which may nevertheless be carried on less than a 210 inch wheel base.

In accordance with the invention, the vehicle includes four seats of the same width as the vehicle starting at the drivers location and proceeding toward the rear. The driver may be seated adjacent the front row of seats and as many as four additional children may be accommodated in comfort alongside the driver. Each of the body width seats is accessible through a separate entrance in alignment with the aisles between seats and advantageously located on only one side of the vehicle.

An important feature of the present invention is the provision of a bus of relatively narrow width, as for example the width of a station wagon which by unique supporting means can be made of extremely elongate size accommodating many people and yet whose body will not sway or otherwise be damaged during normal use.

Another feature of the invention is the provision of a bus of relatively narrow width and having less than a 210 inch wheel base which is so constructed as to accommodate over 30 children with comfort.

Another feature of the present invention is the provision of a bus of relatively narrow width and able to accommodate many passengers which is nevertheless so constructed as to embody therein supporting structure which prevents any damage to the body or chassis of the bus and whereby the bus is provided with safety factors and extreme longevity in usefulness.

Still another feature of the invention is the provision of a rear compartment with four rows of seats of a length approximately three quarters of the width of the vehicle. The rear compartment is accessible through a separate single door apart from the other doors of the vehicle and which is preferably located at the forward end of the compartment to the rear of the last row of full width seats.

The full seating arrangement is designed so that a children's supervisor may sit in the forward seat of the rear compartment section adjacent the access door for this compartment.

The interior of the bus is also provided with a floor mat extending the length of the passenger compartment which includes ribs or ridges extending across the spaces between seat rows to facilitate cleaning of the spaces by flushing the vehicle from one side outwardly through each access. For cleaning purposes the seats are covered with a non-corrosive metalized material which may be flushed down with a liquid, if desired.

Accordingly, it is an object of this invention to provide an improved bus construction.

A further object of the invention is to provide a relatively narrow bus for transporting children including a forward compartment having a plurality of rows of full width seats, each seat being accessible from a separate door, and a rear compartment including a plurality of rows of partial width seats all of which are accessible from a separate single door.

A still further object of the invention is to provide a bus for transporting children including a body which can safely be carried on a wheel base of 210 inches or less.

Another object of the present invention is to provide a bus having a forward compartment capable of carrying 19 children and the driver, and a rear compartment capable of carrying 12 to 15 children and a supervising adult.

A further object of the invention is to provide a bus for transporting children which includes at least four separate seating compartments each accessible through a separate door and which includes seating and matting capable of being flushed with cleaning liquid from one side outwardly through each door.

A further object of the invention is to provide a bus construction which is simple in design, rugged in construction and economical to manufacture.

The various features of novelty which characterize the invention are pointed out with particularity in the claims annexed to and forming a part of this specification. For a better understanding of the invention reference should be had to the accompanying drawings and the accompanying descriptive matter in which there are illustrated and described specific embodiments of the invention.

In the drawings:

FIG. 1 is a horizontal section indicating the interior body construction and seating arrangement of a bus constructed in accordance with the invention;

FIG. 2 is a side view of the undercarriage of the bus showing the supporting structure according to the present invention;

FIG. 3 is a sectional view of the supporting structure of the bus taken along the lines 3—3 of FIG. 2;

FIG. 4 is a bottom view of the supporting structure of the bus;

FIG. 5 is a sectional view taken along the lines 5—5 of FIG. 4;

FIG. 6 is a top plan view on reduced scale of a front to rear floor mat for the bus indicated in FIG. 1; and FIG. 7 is a perspective view of one of the seats of the bus indicated in FIG. 1.

Referring to the drawings in particular, the invention embodied therein includes a bus or passenger vehicle for children generally designated 10 having four wheels 12 mounted on axles spaced to provide a 209½ inch wheel base.

A body generally designated 14 is substantially rectangular and is substantially symmetrically mounted over the wheels 12. The body 14 includes a front engine space or compartment 16 and a plurality of rows of full width seats extending rearwardly therefrom. A forward full width combination driver and passenger seat 18 extends from one side 20 of the body 14 to the other side 22.

In accordance with the invention the forward driver's compartment and the seat 18 is reached through a door 24 for access to the driver's seat pivoted at the forward end of an access defined in side 22 of the body 14. Another door 25 is also provided to facilitate passenger access to this seat.

Three additional full width seats 26, 28 and 30 are located in spaced rows to the rear of seat 18. Aisles 32, 34 and 36 are defined between successive seats in a rearward direction and each aisle is accessible through doors 38, 40 and 42 respectively.

In accordance with another feature of the invention, a rear compartment 44 is provided with four rows of three quarter width seats 46, 48, 50 and 52, and access to this compartment is provided through door 54 pivoted at its forward end in an access defined in wall 20 to the rear of the access for the door 42.

A supervisor for the children, and particularly retarded children, may sit facing forward in the seat 46 of the rear compartment and watch over all children in the rear compartment. The seating arrangement is such that the supervisor seated in seat 46 of the rear compartment is immediately adjacent the rear door and there can be no access to the door without passing directly adjacent to the supervisor.

In accordance with the present invention, the body 14 is relatively narrow in width with the consequent advantages and I have provided supporting structure 60 which will prevent any damage to the frame or body during normal use. This supporting structure is such that the bus may be used for long periods of time without buckling or other damage caused by shifting of weights, rough roads, passenger load, or any other reason. As shown, the supporting structure comprises an outer frame 61 extending beneath the entire body of the vehicle from a point adjacent the front axle 62 thereof to a point adjacent the rear axle 63. There is provided within the frame member 61 another frame member 64 which is, as shown, substantially coextensive with the frame member 61. The respective frames are secured together by welding at the upper portion 65 and lower portion 66 and, in addition, by welding the inner frame 64 so that portions thereof pass out through and are secured around apertures 67 provided in the outer frame. It has been found that this unique supporting structure amply and fully maintains the body without possibility of damage in normal usage of the bus. If desired, a supporting bridge 70 may be positioned along the base of the frame and coextensive therewith to add still greater longevity to the supporting structure of the bus construction. The bridge comprises plate 72 and intermediate rails 73 which are welded to said plates and to the underside of frame 61. This latter structure, as aforesaid, lends additional support to the basic frame made in accordance with the present invention.

As shown in FIGS. 4 and 5, I have devised a new and novel outrigger support for the body of the present invention. The outrigger support, generally designated by the numeral 75, comprises a plurality of angle supports 76 extending completely under the base of the bus from one side of the body completely to the other. The bars are supported between the frame portion 60 and the body 14 of the bus. Heretofore, outriggers were provided between the exterior of the frame and the outer portions of the body. I have found, however, in accordance with the present invention, that the novel outrigger support devised and disclosed herein prevents any possibility of the body tilting and placing undue pressure on the outrigger support. The stresses exerted are taken up along the entire lengths of the multiple bars or beams provided in the outrigger structure and prevents any damage under normal operation of the bus despite the number of people carried and any swaying of the bus which might take place. It may, therefore, be seen that the unique supporting structure for the body of the bus of the present invention enables the construction of a relatively narrow bus carried on less that a 210 inch wheel base while nevertheless able to accommodate a great many passengers.

As a further feature of the invention, a floor mat generally designated 80 (FIG. 6) is provided with sets of spaced ribs 81 located at each aisle. The ribs of the floor mat, according to this invention, are arranged transversely across the longitudinal axis of the bus. This arrangement provides channels directed from one side of the bus to the other facilitating the removal of debris and the like from the floor of the bus. This may be accomplished by jacking the bus upon side 22 opening the door accesses of each aisle on the side 20 of the bus and directing a stream of liquid through windows (not shown) located on side 22 to flush out the debris through said door accesses on the side 20.

To further facilitate the cleaning of the vehicle, each seat includes an upright portion 90 and a horizontal portion 91 made of aluminum sheet material which may be flushed with liquid to clean the seats whenever desired.

An emergency door 95 is provided at the rear 66 of the bus to permit rapid unloading of the rear compartment 14 if necessary.

As an additional safety feature, and particularly adapted for buses designed to carry children, I have provided a padding 97 over the hinge of each of the doors. The padding 97 comprises lined cloth extending from the top of the hinged portion of the door to the bottom. The construction prevents children from having their hands caught within the door. Thereby the hinged area is completely concealed and not available to the children.

The whole arrangement of the interior of the vehicle makes it ideally suited for the safe transport of retarded children under adequate supervision and control. The seat, floor mat and door construction makes the vehicle easy to clean. The seating arrangement makes it possible to rapidly load and unload the vehicle, and up to 20 children may be carried in the forward compartment and up to 16 in the rear compartment. The supporting construction is such that damage under normal usage of the bus is prevented and the bus may be used for lengthy periods of time without repair.

While a specific embodiment of the invention has been shown and described in order to indicate the principles of the invention, those skilled in the art should appreciate that the invention may be embodied in many other forms and variations without departing from the scope of the invention.

I claim:

A vehicle body comprising an elongated rectangular compartment having a front, rear and opposite sides, supportable on and substantially between the limits of a wheel base not to exceed 210 inches, a series of four parallel, full width transverse seats arranged in rows and extending completely across the body, with the foremost seat adjacent the front, means defining an access opening on one side of the body adjacent each of said parallel seats, means defining an access opening in the opposite side of the body adjacent the foremost seat, a fifth seat rearwardly of said four seats and of less width than the full width of the body but exceeding three-quarters of the width of the body, an access opening on said one side adjacent said fifth seat with a relatively narrow aisle space provided between the end of said fifth seat and said last mentioned access opening, a pair of three-quarter width seats rearwardly of said fifth seat each having one end juxtaposed to said opposite side of the body defining a rear compartment space communicating with said aisle space, a rear seat having one end juxtaposed to said opposite end of said body and extending across substantially half the width of said body, and means defining a full width rear opening in said body immediately behind said rear seat.

References Cited in the file of this patent
UNITED STATES PATENTS

| | | |
|---|---|---|
| 1,442,352 | Meister | Jan. 16, 1923 |
| 1,452,369 | Fageol | Apr. 17, 1923 |
| 1,475,328 | Wales | Nov. 27, 1923 |
| 1,637,341 | Holan | Aug. 2, 1927 |
| 2,082,928 | Wilhelmy | June 8, 1937 |
| 2,093,859 | Austin | Sept. 21, 1937 |
| 2,143,666 | Swallow | Jan. 10, 1939 |
| 2,427,649 | Theriault | Sept. 16, 1947 |